(12) United States Patent
Gao et al.

(10) Patent No.: US 10,872,222 B2
(45) Date of Patent: Dec. 22, 2020

(54) DISPLAY PANEL AND DISPLAY DEVICE

(71) Applicant: BOE TECHNOLOGY GROUP CO., LTD., Beijing (CN)

(72) Inventors: Jian Gao, Beijing (CN); Xiaochuan Chen, Beijing (CN); Wei Wang, Beijing (CN); Wenqing Zhao, Beijing (CN); Haisheng Wang, Beijing (CN); Yingming Liu, Beijing (CN); Rui Xu, Beijing (CN); Xiandong Meng, Beijing (CN); Jifeng Tan, Beijing (CN); Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 158 days.

(21) Appl. No.: 16/124,908

(22) Filed: Sep. 7, 2018

(65) Prior Publication Data

US 2019/0080138 A1    Mar. 14, 2019

(30) Foreign Application Priority Data

Sep. 11, 2017 (CN) .......................... 2017 1 0812994

(51) Int. Cl.
*G06K 9/28* (2006.01)
*G06K 9/00* (2006.01)
*G02B 3/00* (2006.01)
*G06K 9/22* (2006.01)

(52) U.S. Cl.
CPC ......... *G06K 9/0004* (2013.01); *G02B 3/0006* (2013.01); *G02B 3/0031* (2013.01); *G06K 9/0008* (2013.01); *G06K 9/22* (2013.01)

(58) Field of Classification Search
CPC .................. G06K 9/0004–9/00046; G06K 9/00006–9/0012
See application file for complete search history.

(56) References Cited

U.S. PATENT DOCUMENTS

| 6,324,020 | B1 | 11/2001 | Teng et al. | |
|---|---|---|---|---|
| 2017/0220840 | A1* | 8/2017 | Wickboldt | ............. G02B 27/30 |
| 2018/0005005 | A1 | 1/2018 | He et al. | |
| 2018/0012069 | A1* | 1/2018 | Chung | ................. A61B 5/1172 |

(Continued)

FOREIGN PATENT DOCUMENTS

| CN | 1369077 A | 9/2002 |
|---|---|---|
| CN | 202018664 U | 10/2011 |

(Continued)

OTHER PUBLICATIONS

Third Chinese Office Action dated Dec. 3, 2019.
First Chinese Office Action dated Nov. 21, 2018.

*Primary Examiner* — Brian Werner
(74) *Attorney, Agent, or Firm* — Dilworth & Barrese, LLP.; Michael J. Musella, Esq.

(57) ABSTRACT

A display panel and a display device are disclosed. The display panel includes a display-side substrate, and a display array layer, a lens layer and an image array layer, which are sequentially provided at a side of the display-side substrate. The display array layer includes a plurality of display pixels arranged in an array; and the image array layer includes a plurality of image pixels arranged in an array, and is configured to form an image with light being reflected from a display side and passing through the lens layer.

16 Claims, 9 Drawing Sheets

(56) References Cited

U.S. PATENT DOCUMENTS

| | | | | |
|---|---|---|---|---|
| 2018/0129852 A1* | 5/2018 | Zeng | .................... | G06K 9/0004 |
| 2018/0260605 A1 | 9/2018 | Wu et al. | | |
| 2019/0138154 A1* | 5/2019 | Smith | .................... | G06F 3/0421 |
| 2019/0228204 A1* | 7/2019 | Park | .................... | G02B 3/0006 |

FOREIGN PATENT DOCUMENTS

| | | |
|---|---|---|
| CN | 105550664 A | 5/2016 |
| CN | 106228147 A | 12/2016 |
| CN | 107004130 A | 8/2017 |

* cited by examiner

DISPLAY PANEL AND DISPLAY DEVICE

CROSS-REFERENCE OF RELATED APPLICATION

The present application claims priority to Chinese patent application No. 201710812994.0, filed on Sep. 11, 2017, the entire disclosure of which is incorporated herein by reference as part of the present application.

TECHNICAL FIELD

Embodiments of present disclosure relate to a display panel and a display device.

BACKGROUND

With the rapid development of mobile payment and mobile information exchange, the demand for convenient and effective security technology, which is suitable for display devices, is increasing. The fingerprint recognition technology, palmprint recognition technology and iris recognition technology are gradually adopted by mobile electronic devices. Biorecognition functions, such as the fingerprint recognition function, palmprint recognition function and iris recognition function, can be realized through introducing a separate imaging module, but it will increase size, weight and power consumption of a display device, and this is contrary to the consumers' requirements of electronic products, especially consumer electronic products.

SUMMARY

At least one embodiment of present disclosure provides a display panel, and the display panel comprises a display-side substrate, and a display array layer, a lens layer and an image array layer, which are sequentially provided at a side of the display-side substrate. The display array layer comprises a plurality of display pixels arranged in an array; and the image array layer comprises a plurality of image pixels arranged in an array, and is configured to form an image with light being reflected from a display side and passing through the lens layer.

For example, in the display panel provided by at least one embodiment of present disclosure, each of the display pixels comprises a light-emitting diode and the light-emitting diode emits light toward the display side; and the light-emitting diode comprising a reflective electrode or a reflective layer, so as to reflect light emitted by the light-emitting diode toward the display side.

For example, in the display panel provided by at least one embodiment of present disclosure, the reflective electrode or the reflective layer has an opening so as to allow the light reflected from the display side to pass through the reflective electrode or the reflective layer.

For example, in the display panel provided by at least one embodiment of present disclosure, the lens layer comprises a plurality of micro-lenses arranged in an array; and a surface, which is closer to the image array layer, of each of the plurality of micro-lenses is a flat surface.

For example, in the display panel provided by at least one embodiment of present disclosure, the each of the plurality of micro-lenses is a spherical lens, an aspheric lens or a binary optical lens.

For example, in the display panel provided by at least one embodiment of present disclosure, a focal length of the each of the plurality of micro-lenses is in a range from 220 micrometers to 400 micrometers; an optical aperture of the each of the plurality of micro-lenses is in a range from 100 micrometers to 220 micrometers; and a spacing between adjacent micro-lenses is in a range from 250 micrometers to 300 micrometers.

For example, in the display panel provided by at least one embodiment of present disclosure, the display panel further comprises an aperture array layer. The aperture array layer is provided between the lens layer and the image array layer; the aperture array layer comprises hole-like light-transmitting regions arranged in an array, and light-shielding regions configured for separating adjacent hole-like light-transmitting regions; and the hole-like light-transmitting regions are in one-to-one correspondence with the plurality of micro-lenses.

For example, in the display panel provided by at least one embodiment of present disclosure, a center of an orthographic projection of the each of the plurality of micro-lenses on the aperture array layer and a center of a corresponding hole-like light-transmitting region are overlapped with each other; and a diameter of each of the hole-like light-transmitting regions is in a range from 40 micrometers to 80 micrometers.

For example, in the display panel provided by at least one embodiment of present disclosure, the display panel further comprises a first substrate and a second substrate. The first substrate is provided between the display array layer and the lens layer; and the second substrate is provided between the aperture array layer and the lens layer.

For example, in the display panel provided by at least one embodiment of present disclosure, the display panel further comprises a first mold frame. The first mold frame is provided between the first substrate and the second substrate and is opposite to a peripheral area of the display panel; and refractive index of the plurality of micro-lenses is in a range from 1.4 to 1.6.

For example, in the display panel provided by at least one embodiment of present disclosure, the display panel further comprises a filler. The filler is provided between the first substrate and the second substrate and fills in gap around the each of the plurality of micro-lenses; and refractive index of the lens layer is in a range from 1.7 to 1.9, and refractive index of the filler is in a range from 1.2 to 1.4.

For example, in the display panel provided by at least one embodiment of present disclosure, the display panel further comprises an intermediate dielectric layer. The intermediate dielectric layer is provided between the image array layer and the aperture array layer; the intermediate dielectric layer is configured to adhere the image array layer to the aperture array layer; and the intermediate dielectric layer is further configured to adjust a distance, between the image array layer and the aperture array layer, in a direction perpendicular to the image array layer.

For example, in the display panel provided by at least one embodiment of present disclosure, the display panel further comprises a side light source. The side light source is provided on at least one side surface of the display-side substrate, and light emitted by the side light source is incident onto the display-side substrate; the side light source and the display-side substrate is configured to allow the light emitted by the side light source to satisfy total reflection condition of a first interface, and is further configured to allow at least part of the light emitted by the side light source not to satisfy total reflection condition of a second interface; and the first interface is an interface formed by the display-side substrate and air, and the second interface is an interface formed by the display-side substrate and skin of a finger.

For example, in the display panel provided by at least one embodiment of present disclosure, the display panel further comprises a second mold frame, wherein the second mold frame is provided between the display-side substrate and the display array layer and is opposite to a peripheral area of the display panel.

At least one embodiment of present disclosure further provides a display device, and the display device comprises the display panel provided by any one of the embodiments of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
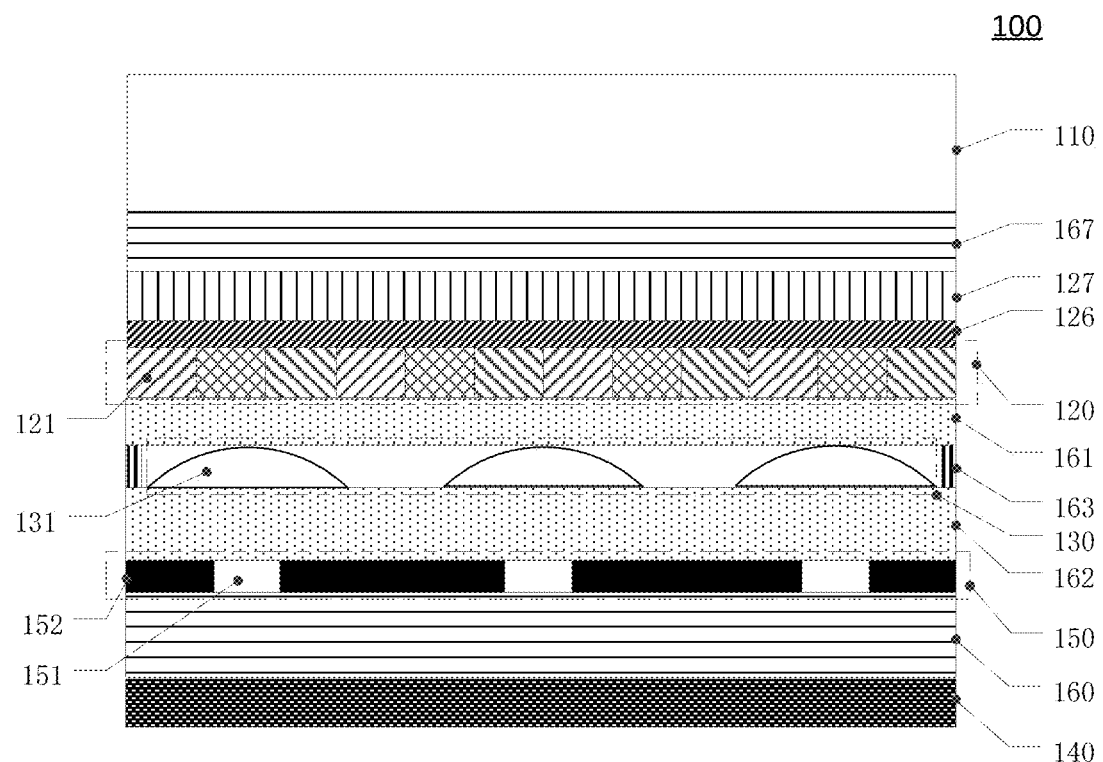
FIG. 1A is a cross-sectional view of a display panel provided by an embodiment of present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

The embodiments of the present disclosure provide a display panel and a display device, and the display panel and the display device have imaging capability, such that fingerprint identification function can be achieved.

At least one embodiment of present disclosure provides a display panel, and the display panel comprises a display-side substrate, and a display array layer, a lens layer and an image array layer, all of which are sequentially provided at a side of the display-side substrate. The display array layer comprises a plurality of display pixels arranged in an array; and the image array layer comprises a plurality of image pixels arranged in an array, and the image array layer is configured to image with light, which is reflected from a display side and passes through the lens layer.

In some embodiments, for example, the display panel may use light emitted by the display array layer as backlight (i.e., light used for illuminate an object to be imaged) for imaging; for another example, the display panel may also provide the backlight for imaging through providing an additional light source.

In some embodiments, for example, the lens layer may comprise a plurality of micro-lenses arranged in an array. According to specific implementation demands, the micro-lens may be implemented as a spherical lens, an aspherical lens or a binary optical lens. For another example, the lens layer may be implemented as a lens or a lens set.

In some embodiments, for example, the lens layer may be attached to the display array layer through frame attaching method; for another example, the lens layer may be attached to the display array layer through surface attachment method.

In some embodiments, for example, the display-side substrate may be attached to the display array layer through frame attaching method; for another example, the display-side substrate may be attached to the display array layer through surface attachment method.

In some embodiments, in order to allow the image array layer to be able to image with the light reflected from the display side, for example, each of the display pixels may comprise a reflective electrode or a reflective layer, and the reflective electrode or the reflective layer may have an opening so as to allow the light, which is reflected from the display side to pass through the reflective electrode or the reflective layer; for another example, each of the display pixels may comprise the reflective layer, and at least part of light, which is reflected from the display side and incident onto the reflective layer may transmit the reflective layer.

Non-limitive descriptions are given to the display panel provided by the embodiments of the present disclosure in the following with reference to a plurality of embodiments. As described in the following, in case of no conflict, different features in these specific embodiments can be combined so as to obtain new embodiments, and the new embodiments are also fall within the scope of present disclosure.

An embodiment of present disclosure provides a display panel 100. For example, FIG. 1A is a cross-sectional view of a display panel provided by an embodiment of present disclosure. For example, as illustrated in FIG. 1A, the display panel 100 comprises a display-side substrate 110, and a display array layer 120, a lens layer 130 and an image array layer 140, which are sequentially provided at a side (for example, a lower side below the display-side substrate 110) of the display-side substrate 110.

Figure 1B:
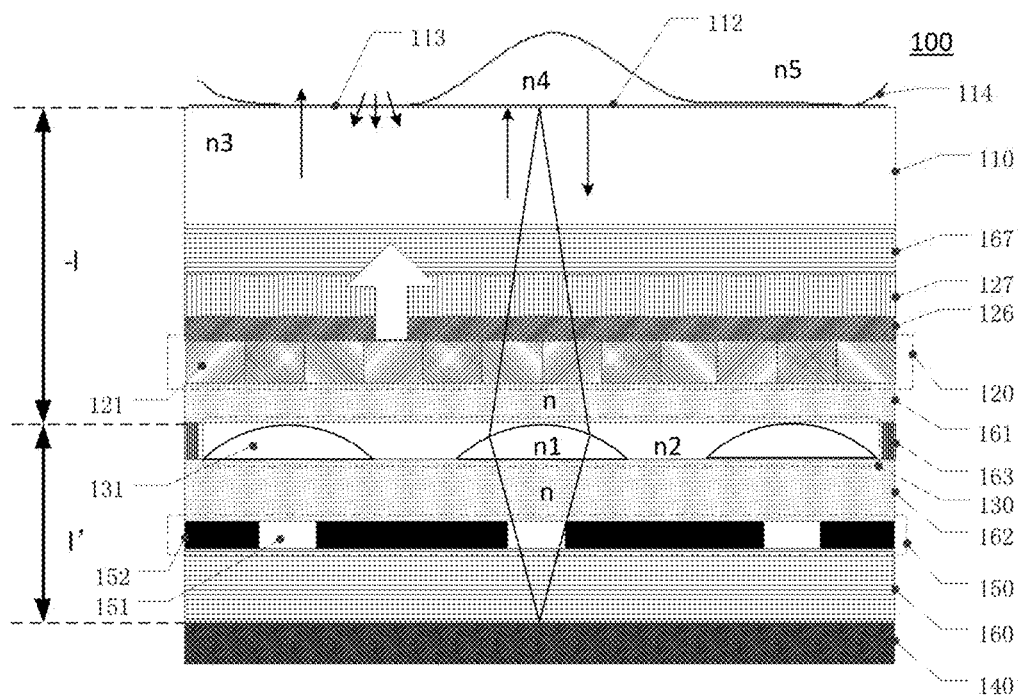
FIG. 1B is a schematic diagram illustrating an exemplary arrangement of a display panel provided by an embodiment of present disclosure.

For example, as illustrated in FIG. 1A and FIG. 1B, the display array layer 120 may comprise a plurality of display pixels 121 arranged in an array. For example, each of the display pixels 121 may comprise a light-emitting diode 122, and the light-emitting diode 122 may be implemented as an organic light-emitting diode (OLED), and may also be implemented as an inorganic light-emitting diode, and no limitation will be given to the embodiments of the present disclosure in this respect. For example, as illustrated in FIG. 1B, the light-emitting diode 122 may emit light toward a display side; for example, "the display side" in the embodiments of the present disclosure is a side, which is away from the image array layer 140, of the display pixel 121.

Figure 2A:
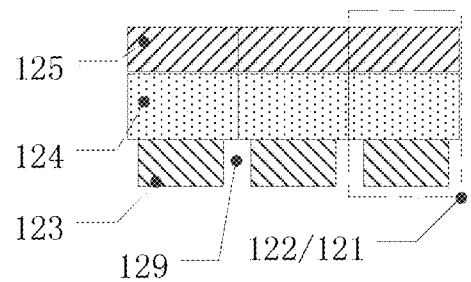
FIG. 2A is a cross-sectional view of a display array layer of a display panel provided by an embodiment of present disclosure.

For example, as illustrated in FIG. 2A, each light-emitting diode 122 may comprise a cathode 125, a light-emitting layer 124 and an anode 123. For example, the light-emitting diode 122 may comprise a reflective electrode, so as to reflect light emitted by the light-emitting diode 122 toward the display side, to increase light-emitting efficiency of the light-emitting diode 122, and to suppress adverse effect to the image array layer 140. For example, for top-emitting OLED, the anode 123 may be configured as the reflective electrode, for example the anode 123 may be formed by a lamination structure of an indium tin oxide (ITO) layer and a metal layer. For example, as illustrated in FIG. 2A, the reflective electrode may comprise an opening 129, so as to allow light, which is reflected from the display side to pass through the reflective electrode. For example, the opening 129 can allow light reflected by the display-side substrate 110 to pass through the reflective electrode; for another example, the opening 129 can also allow light reflected by the skin of a finger to pass through the reflective electrode. Furthermore, no anode or no cathode is provided at a region, corresponding to the opening, of the light-emitting diode 122, such that the region corresponding to the opening emits no light, and thus adverse effect to the image quality of the image array layer 140 can be avoided.

Figure 2B:
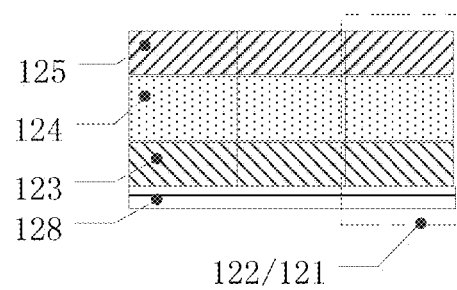
FIG. 2B is a cross-sectional view of another display array layer of a display panel provided by an embodiment of present disclosure.

For example, as illustrated in FIG. 2B, the light-emitting diode 122 may further comprise a reflective layer 128, and the reflective layer 128 may reflect the light emitted by the light-emitting diode 122 toward the display side; in this case, the cathode 125 and the anode 123 of the light-emitting diode 122 may be fabricated by a transparent conductive material or thin metal layer, so as to allow the cathode 125 and the anode 123 is transparent or semitransparent (for example, the cathode 125 and the anode 123 may be respectively made of a transparent conductive material and a transparent alloy material). For example, the reflective layer 128 may be implemented as a multilayer dielectric film, and the multilayer dielectric film may reflect the light emitted by the light-emitting diode 122; the multilayer dielectric film, for example, may reflect visible light. For example, according to specific implementation demands, the reflective layer 128 may have an opening (not illustrated in FIG. 2B), so as to allow light, which is reflected from the display side to pass through the reflective layer 128. For another example, according to specific implementation demands, the reflective layer 128 may have light-transmitting capability with respect to specific wavelength range (for example, infrared wavelength range) or wavelength (for example, 976 nm).

For example, as illustrated in FIG. 1A, according to specific implementation demands, the display panel 100 may further comprise an encapsulation layer 126 (for example, a thin-film encapsulation layer 126), and the encapsulation layer 126 may be provided at a side, which is away from the image array layer 140, of the display array layer 120, such that oxidation, which is caused by moisture or oxygen in the air, of the light-emitting diode 122 can be alleviated. For example, according to specific implementation demands, the display panel 100 may further comprise a polarizing layer 127 (for example, a circular polarizer), and the polarizing layer 127 may be provided at a side, which is away from the image array layer 140, of the display array layer 120 (for example, a side, which is away from the encapsulation layer 126, of the display array layer 120), such that deterioration, which is caused by reflection of ambient light, of display quality of the display array layer 120 can be alleviated. For example, the encapsulation layer 126 and the polarizing layer 127 may be implemented as components of the display array layer 120.

Figure 2C:
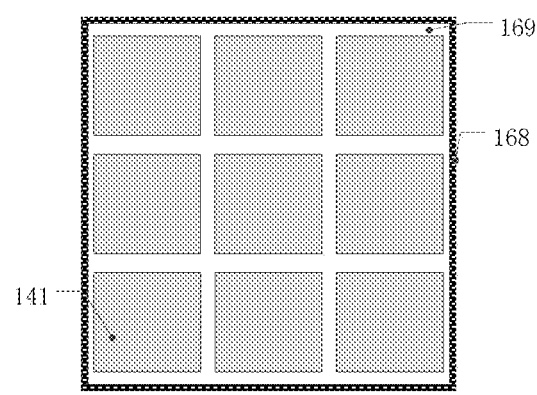
FIG. 2C is a plan view of an image array layer of a display panel provided by an embodiment of present disclosure.

For example, as illustrated in FIG. 1A and FIG. 2C, the image array layer 140 may comprise a plurality of image pixels 141 arranged in an array. For example, the display panel 100 may comprise a peripheral area 168 and a working area 169; the peripheral area 168 of the display panel 100 may be an edge region of the display panel 100, and the working area 169 of the display panel 100 may be a region surrounded by the peripheral area 168. For example, the plurality of image pixel 141 may be arranged in an array in the working area 169 of the display panel 100.

For example, the image pixel 141 may comprises suitable elements according specific implementation demands. For example, the image pixel 141 may comprise a photodiode and a switching transistor, and the photodiode may convert light incident onto the photodiode into electrical signals; the switching transistor is electrically connected to the photodiode, so as to control whether or not the photodiode is in the light acquisition state and the light acquisition time. For example, the types and arrangement of the photodiode may be set according to specific implementation demands, and no limitation will be given to the embodiments of the present disclosure in this respect. For example, the photodiode may be implemented as a PIN junction type photodiode or a phototransistor, so as to increase the response speed of the photodiode.

Figure 1C:
FIG. 1C is a fingerprint image obtained by an image array layer of a display panel provided by an embodiment of present disclosure.

For example, the image pixel 141 is configured to form an image with light, which is reflected from a display side and passes through the lens layer 130. For example, the image pixel 141 may form an image with light, which is reflected by the display-side substrate 110 and passes through the lens layer 130. For another example, the image pixel 141 may also form an image with light (i.e., diffuse light), which is diffuse reflected by the skin of the finger and passes through the lens layer 130, such that fingerprint identification function can be achieved. Therefore, the display panel 100 provided by the embodiments of the present disclosure can have imaging capability. For example, FIG. 1C is a fingerprint image sample obtained by an image array layer 140 through fingerprint imaging.

For example, the fingerprint imaging function of the display panel 100 provided by the embodiments of the present disclosure are detailedly described in the following with reference to the display panel 100 as illustrated in FIG. 1B. For example, in the case that light emitted by the display pixel 121 is incident onto an interface (for example, a first interface 112 or a second interface 113), which is away from the image array layer 140, of the display-side substrate 110, part of the light is reflected by the interface (for example, the first interface 112), and back into the display panel 100; another part of the light exits from the display panel 100, and diffuse reflection is occurred in the case that the light, which exits from the display panel 100, is incident onto the skin of the finger. Furthermore, part of light originated from diffuse reflection may back into the display panel 100.

For example, as illustrated in FIG. 1B, the fingerprint 114 of the finger has profiles formed by convex structures (i.e., fingerprint ridges) and concave structures (i.e., fingerprint valleys). In the case that the finger is in contact with the display-side substrate 110, the fingerprint ridge is in contact with the display-side substrate 110 and the fingerprint valley is not in contact with the display-side substrate 110; the first interface 112 is formed by the display-side substrate 110 and air provided between the fingerprint valley and the display-side substrate 110, and the second interface 113 is formed by the fingerprint ridge (i.e., skin) and the display-side substrate 110. For example, because the refractive index n5 of the skin (for example, n5=1.55) is closer to the refractive index of n3 (for example, for regular glass, n3=1.5) of the display-side substrate 110, compared with the refractive index n4 of the air (for example, n4=1), intensity of reflection light, which is emitted by the display pixel 121 and reflected by the first interface 112, is greater than intensity of reflection light, which is emitted by the display pixel 121 and reflected by the second interface 113. For example, in the case of normal incidence, the reflectivity Ref of the interface satisfies the following equation Ref=$((nr-1)/(nr+1))^2$, in which nr is relative refractive index. For example, in the case that the refractive index n4 of the air, the refractive index n5 of the skin and the refractive index n3 of the display-side substrate 110 are respectively equal to 1, 1.55 and 1.5, the relative refractive index nr of the first interface 112 is 1.5, and the relative refractive index of the second interface 113 is approximately equal to 0.97; therefore, a ratio between intensity of light reflected by the first interface 112 and intensity of light reflected by the second interface 113 is equal to 4%/0.023%=173.9.

For example, compared with intensity of light, which is incident onto the image array layer 140 after being reflected by an interface (for example, the first interface 112) and back into the display panel 100, intensity of light, which is incident onto the image array layer 140 after being diffuse reflected by the skin of the finger and back into the display panel 100, is weak (for example, negligible). Therefore, in a fingerprint image obtained by the image array layer 140, the brightness of the fingerprint image corresponding to the fingerprint valley is relatively strong, and the brightness of the fingerprint image corresponding to the fingerprint ridge is relatively weak. For example, the contrast ratio (or the modulation degree of the fingerprint image) of the fingerprint image obtained by the display panel 100 can be increased through choosing appropriate refractive index n3 of the display-side substrate 110 (for example, the refractive index n3 is slightly smaller than the refractive index of the skin of the finger).

Figure 3A:
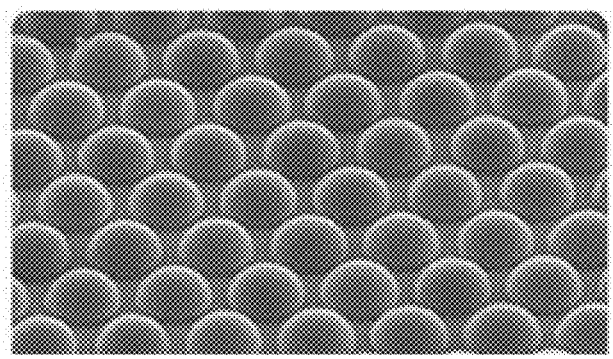
FIG. 3A is a structural schematic diagram of a lens layer of a display panel provided by an embodiment of present disclosure.
Figure 3B:
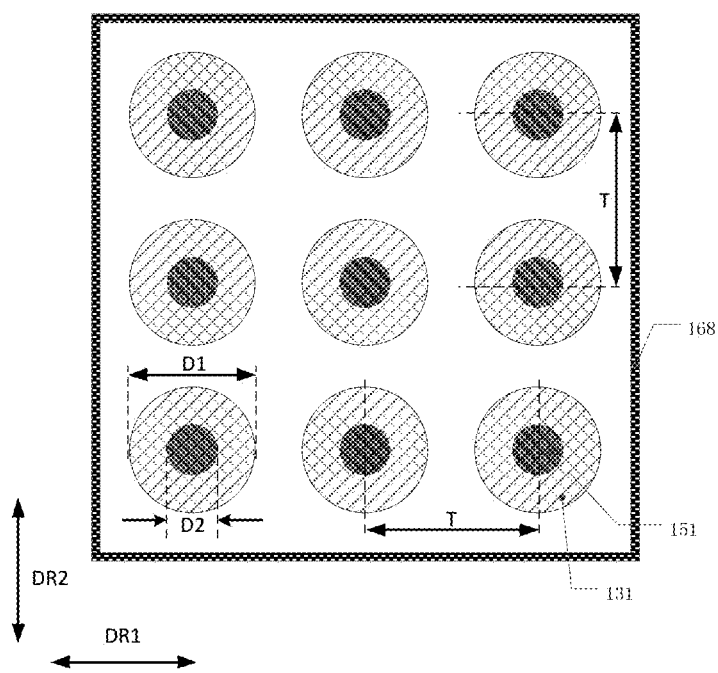
FIG. 3B is a plan view of a lens layer and an aperture array layer of a display panel provided by an embodiment of present disclosure.

For example, specific structures of the lens layer 130 may be set according to specific implementation demands, and no limitation will be given to the embodiments of the present disclosure in this respect. For example, as illustrated in FIG. 1A, FIG. 3A and FIG. 3B, according to specific implementation demands, the lens layer 130 may comprise a plurality of micro-lenses 131 arranged in an array, so as to decrease the thickness of the display panel 100. For example, the micro-lens 131 may be implemented as a spherical lens, an aspherical lens or a binary optical lens (for example, a Fresnel lens, a grating based diffractive lens, or a step shaped diffractive lens). For example, as illustrated in FIG. 1A, a surface, which is closer to the image array layer 140, of each of the micro-lenses 131 is a flat surface. For example, in the case that the micro-lens 131 is implemented as the spherical lens or the aspherical lens, a surface, which is closer to the display array layer 120, of each of the micro-lenses 131 is a curved surface. For example, in the case that the micro-lens 131 is implemented as the step shaped diffractive lens, the surface, which is closer to the display array layer 120, of each of the micro-lenses 131 is a surface with steps. It should be noted that, the lens layer 130 provided by the embodiments of the present disclosure are not limited to comprise a plurality of micro-lenses 131 arranged in an array, for example, according to specific implementation demands, the lens layer 130 provided by the embodiments of the present disclosure may also implemented as a single lens or a single lens set (for example, a plurality of lenses laminated along a direction perpendicular to the display-side substrate 110).

For example, as illustrated in FIG. 1A and FIG. 3B, the display panel 100 may further comprise an aperture array layer 150. For example, the aperture array layer 150 may be provided between the lens layer 130 and the image array layer 140. The aperture array layer 150 comprises hole-like light-transmitting regions 151 arranged in an array, and light-shielding regions 152 for separating the hole-like light-transmitting regions 151. For example, the hole-like light-transmitting regions 151 are in one-to-one correspondence with the micro-lens 131. For example, a center of each of the hole-like light-transmitting regions 151 is concentric with a center of corresponding micro-lens 131, that is, a center of an orthographic projection of each of the micro-lenses 131 on the aperture array layer 150 and a center of a corresponding hole-like light-transmitting regions 151 are overlapped with each other; and in the above-mentioned case, a center-to-center distance between adjacent hole-like light-transmitting regions 151 is equal to a center-to-center distance between adjacent micro-lens 131. For example, the aperture array layer 150 can suppress image aberrations (for example, the off-axis aberration). For another example, the aperture array layer 150 can also shield stray light and increase imaging quality of the image array layer 140.

For example, as illustrated in FIG. 1A, the display panel 100 may further comprise a first substrate 161, and the first substrate 161 may be provided between the display array layer 120 and the lens layer 130. For example, the first substrate 161 can be used to support the display array layer 120 when fabricating the display array layer 120. For example, the first substrate 161 may be implemented as a component of the display array layer 120.

Figure 3C:
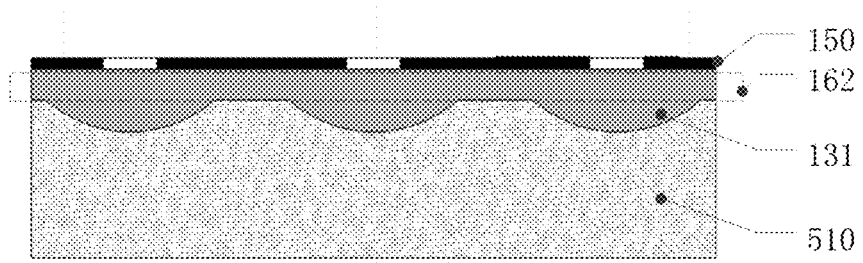
FIG. 3C is a schematic diagram of an exemplary manufacturing method of a lens layer.

For example, as illustrated in FIG. 2A, the display panel 100 may further comprise a second substrate 162, and the second substrate 162 may be provided between the aperture array layer 150 and the lens layer 130. For example, in the case that the lens layer 130 comprises a plurality of micro-lenses 131 arranged in an array, the second substrate 162 may support or fix the micro-lens 131. For example, as illustrated in FIG. 3C, according to specific implementation demands, the micro-lens 131 and the second substrate 162 may be formed integrally (for example, formed by a corresponding mold 510), that is, the micro-lens 131 and the second substrate 162 are formed of same one material; the aperture array layer 150 may be formed at a side, which is away from the micro-lens 131, of the second substrate 162. For example, the first substrate 161 and the second substrate 162 may be a glass substrate, a quartz substrate, a plastic substrate (such as a polyethylene terephthalate (PET) substrate), or a substrate made of other suitable materials.

For example, the method for attaching the lens layer 130 to the display array layer 120 may be chosen according to specific implementation demands, and no limitation will be given to the embodiments of the present disclosure in this respect. For example, the method for attaching the lens layer 130 to the display array layer 120 is detailedly described in the following with reference to FIG. 1B and FIG. 4A and by taking the following case as an example, that is, the lens layer 130 comprises a plurality of micro-lenses 131 arranged in an array, and the display panel 100 further comprises the first substrate 161 and the second substrate 162.

For example, as illustrated in FIG. 1B, the lens layer 130 and the display array layer 120 may be attached to each other through frame attaching method. For example, as illustrated in FIG. 1B, the display panel 100 may further comprise a first mold frame 163, and the first mold frame 163 is provided between the first substrate 161 and the second substrate 162, and is opposite to a peripheral area 168 of the display panel 100. For example, the first mold frame 163 may allow the first substrate 161 and the second substrate 162 to be adhered together, and may provide support functions. For example, for an attaching method as illustrated in FIG. 1B, a medium around the micro-lens 131 (i.e., a medium, which is provided between the first substrate 161 and the second substrate 162 and around the micro-lens 131) may be the air, and therefore, the refractive index n2 of the medium around the micro-lens 131 is equal to 1; in this case, the micro-lens 131 may be fabricated by a material with refractive index being equal to 1.4-1.6 (for example, 1.48-1.55). For example, the micro-lens 131 may be fabricated by polymethyl methacrylate (PMMA), and in this case, the refractive index n1 of the micro-lens 131 may be approximately equal to 1.4918. For example, the first substrate 161 and the second substrate 162 may be fabricated with same one material, for example, the refractive index n of the first substrate 161 and the second substrate 162 may be approximately equal to 1.5164, but the embodiments of the present disclosure are not limited to this case.

Figure 4A:
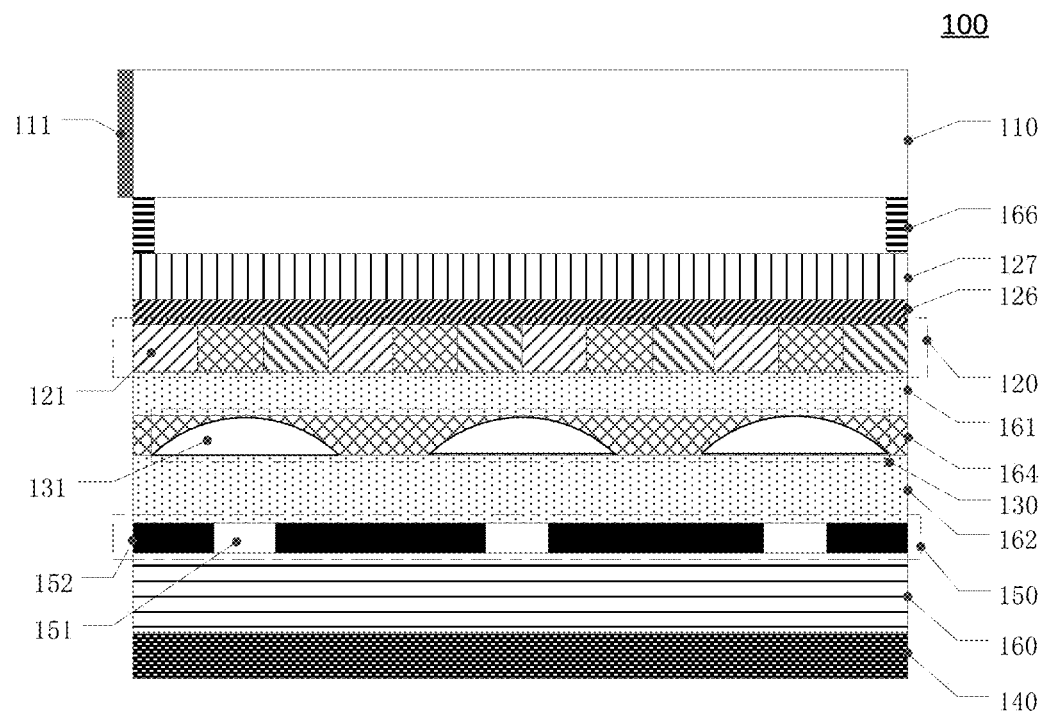
FIG. 4A is a cross-sectional view of a display panel provided by another embodiment of present disclosure.

For example, as illustrated in FIG. 4A, the lens layer 130 and the display array layer 120 may be attached to each other through a surface attaching method; in the case that the surface attaching method is adopted, the display panel 100 may further comprise a filler 164, and the filler 164 is provided between the first substrate 161 and the second substrate 162, and fills in gap around each of the micro-lenses 131. For example, for an attaching method as illustrated in FIG. 4A, the micro-lens 131 may be fabricated by a material with refractive index being approximately equal to 1.7-1.9 (for example, 1.75-1.85). For example, the refractive index of the micro-lens 131 may be approximately equal to 1.8, and the filler 164 may be fabricated by a material with refractive index being approximately equal to 1.2-1.4 (for example, 1.25-1.35). For example, the refractive index of the micro-lens 131 may be approximately equal to 1.3.

For example, the method for attaching the image array layer 140 to the aperture array layer 150 may be chosen according to specific implementation demands, and no limitation will be given to the embodiments of the present disclosure in this respect. For example, as illustrated in FIG. 1A, the image array layer 140 and the aperture array layer 150 may be attached to each other through an adhesion method. For example, in the case that the image array layer 140 and the aperture array layer 150 is attached to each other through the adhesion method, the display panel 100 may further comprise an intermediate dielectric layer 160 provided between the image array layer 140 and the aperture array layer 150. The intermediate dielectric layer 160 is adhesive, and may allow the image array layer 140 and the aperture array layer 150 to be adhered together. For example, the intermediate dielectric layer 160 may be implemented as an optically clear adhesive (OCA). For example, the intermediate dielectric layer 160 may be further configured to adjust a distance, between the image array layer 140 and the aperture array layer 150, in a direction perpendicular to the image array layer. For example, the distance, between the image array layer 140 and the aperture array layer 150, in a direction perpendicular to the image array layer, can be adjusted by adjusting the thickness of the optically clear adhesive. For another example, the intermediate dielectric layer 160 may also be implemented as a structure including a transparent substrate (not illustrated in figures), and both sides of the transparent substrate may be provided with the optically clear adhesive (for example, the transparent substrate may be inserted into the optically clear adhesive), and in this case, the distance adjusting capability of the intermediate dielectric layer 160 is increased.

For example, the thickness, refractive index and material of the display-side substrate 110 may be chosen according to specific implementation demands, and no limitation will be given to the embodiments of the present disclosure in this respect. For example, the thickness of the display-side substrate 110 may be approximately equal to 550-650 micrometers (for example, 500 micrometers); for example, the refractive index of the display-side substrate 110 may be approximately equal to 1.4-2 (for example, 1.45-1.55); for example, the material for fabricating the display-side substrate 110 may be glass (for example, quartz glass), but the embodiments of the present disclosure are not limited to this case.

For example, the method for attaching the display-side substrate 110 to the display array layer 120 may be chosen according to specific implementation demands, and no limitation will be given to the embodiments of the present disclosure in this respect. For example, the method for attaching the display-side substrate 110 and the display array layer 120 is described in the following with reference to FIG. 1B and FIG. 4A.

For example, as illustrated in FIG. 1B, the display-side substrate 110 and the display array layer 120 (or the polarizing layer 127) may be attached to each other by adopting the surface attaching method. For example, as illustrated in FIG. 1B, the display panel 100 may further comprise a second intermediate dielectric layer 167. For example, the second intermediate dielectric layer 167 may be an optically clear adhesive, but the embodiments of the present disclosure are not limited to this case.

For example, as illustrated in FIG. 4A, the display-side substrate 110 and the display array layer 120 (or the polarizing layer 127) may be attached to each other by adopting the frame attaching method. For example, as illustrated in FIG. 4A, the display panel 100 may further comprise a second mold frame 166, and the second mold frame 166 may be provided between the display-side substrate 110 and the display array layer 120, and is opposite to the peripheral area 168 of the display panel 100. For example, the second mold frame 166 may allow the display-side substrate 110 and the display array layer 120 (or the polarizing layer 127) to be adhered together and provide supporting functions.

For example, structural parameters of the display panel 100 provided by an embodiment of present disclosure will be described illustratively in the following with reference to FIG. 1B, FIG. 3B, FIG. 3C and FIG. 3D.

Figure 3D:
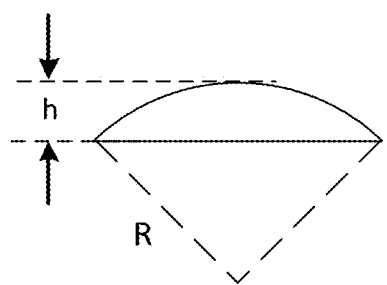
FIG. 3D is an exemplary arrangement of a spherical lens.

For example, as illustrated in FIG. 1B, n1 is the refractive index of the micro-lens 131, n2 is the refractive index of the medium around the micro-lens 131, and n is the refractive index of the first substrate 161 and the second substrate 162. For example, as illustrated in FIG. 3B, D1 is an optical aperture of the micro-lens 131; D2 is the diameter of the hole-like light-transmitting regions 151, T is the center-to-center distance between adjacent micro-lenses 131. For example, as illustrated in FIG. 3D, his the arch height of the micro-lens 131 and R is the radius of the micro-lens 131.

For example, according to specific implementation demands, the optical aperture of D1 of the micro-lens 131 may be approximately equal to 100-220 micrometers; the diameter of the hole-like light-transmitting regions 151 may be approximately equal to 40-80 micrometers; the center-to-center distance T between adjacent micro-lenses 131 is approximately equal to 250-300 micrometers; and the focal length of the micro-lens 131 may be approximately equal to 220-400 micrometers.

For example, as illustrated in FIG. 1B, "−1" is the distance between the surface, which is away from the image array layer 140, of the display-side substrate 110 and the surface, which is closer to the display-side substrate 110, of the lens layer 130; for example, −1 may be equal to the sum of the thickness of the display-side substrate 110, the thickness of the second intermediate dielectric layer 167, the thickness of the polarizing layer 127, the thickness of the encapsulation layer 126, the thickness of the display array layer 120 and the thickness of the first substrate 161. For example, the value of −1 is mainly dependent on the manufacturing processes of the display array layer 120. For example, the value of −1 may be approximately equal to 800-1020 micrometers. For example, the value of −1 may be 930 micrometers, that is, 1=−930 micrometers, but the embodiments of the present disclosure are not limited to this case.

For example, as illustrated in FIG. 1B, 1' is the distance between the surface, which is closer to the display-side substrate 110, of the image array layer 140 and the surface, which is closer to the display-side substrate 110, of the lens layer 130. For example, 1' may be equal to the sum of the arch height of the micro-lens 131, the thickness of the second substrate 162, the thickness of the aperture array layer 150 and the thickness of the intermediate dielectric layer 160. For example, the value of 1' may be set according to the resolution of the image array layer 140. For example, the value of 1' is decreased along with an increase of the resolution of the image array layer 140, and the value of 1', for example, may be approximately equal to 230-950 micrometers. For example, in the case that the PPI (the number of the image pixel 141 per inch) of the image array layer 140 is equal to 1000, the value of 1' for example may be approximately equal to 390-480 micrometers; for another example, in the case that the PPI of the image array layer 140 is equal to 750, the value of 1' for example may be approximately equal to 570-730 micrometers. For example, the value of 1' can be changed by adjusting the thickness of the intermediate dielectric layer 160, such that the design flexibility of the micro-lens 131 and the imaging quality of the display panel 100 can be increased, especially when the micro-lens 131 and the second substrate 162 are formed integrally. It should be noted that, the PPI of the image array layer 140 is not limited to be equal to 1000 or 750; for example, the PPI of the image array layer 140 may also be set to be other suitable values (for example, 400), and the value of 1' is changed accordingly.

For example, in the case that the value of 1' and the value of 1 are known, the focal length f' of the micro-lens 131 may be calculated based on the object-image relationship of the micro-lens 131; and then the radius of the micro-lens 131 can be obtained based on the relationship between the focal length and the radius of the micro-lens 131. The object-image relationship of the micro-lens 131 and the relationship between the focal length and the radius of the micro-lens 131 are respectively satisfy the following equations:

$$\frac{1}{l'} - \frac{1}{l} = \frac{1}{f'},$$

$$f' = \frac{n_1 r}{n-1}.$$

For example, the center-to-center distance T between adjacent micro-lenses 131 may be set according to the average value of the period of the valley-ridge of the fingerprint, for example, the value of the center-to-center distance between adjacent micro-lenses 131 may be equal to 250-300 micrometers. For example, the center-to-center distance T between adjacent micro-lenses 131 may be set according to the value of the period of the valley-ridge of the fingerprint. For example, the average value of the period of the valley-ridge of the fingerprint of an adult is approximately equal to 400 micrometers and T=282.8 micrometers may be obtained according to the following equation, $\sqrt{2}T=400$. Therefore, the center-to-center distance T between adjacent micro-lenses 131 may be set to be 282.8 micrometers, but the embodiments of the present disclosure are not limited to this case.

Figure 3E:
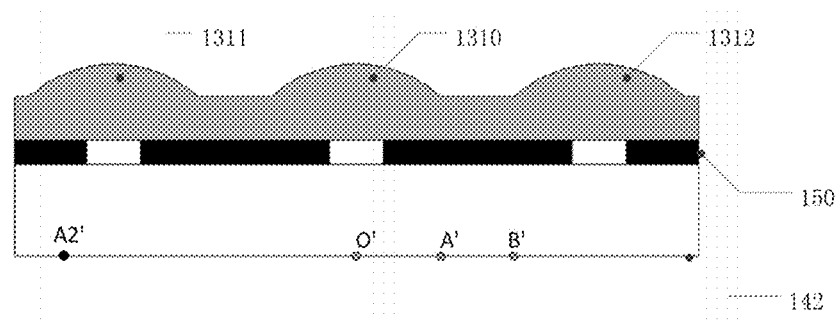
FIG. 3E is a cross-sectional view of a lens layer, an aperture array layer and an imaging plane.
Figure 3F:
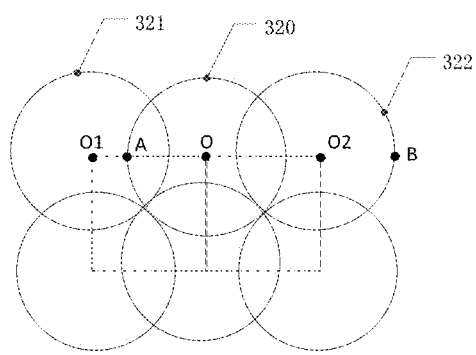
FIG. 3F is a schematic diagram of object-space field of view.
Figure 3G:
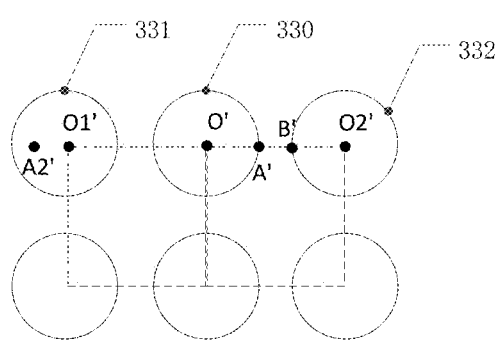
FIG. 3G a schematic diagram of image-space field of view.

For example, the imaging function of the micro-lens is detailedly described in the following with reference to FIG. 3E, FIG. 3F and FIG. 3G. For example, FIG. 3E illustrates a micro-lens 1310 (i.e., the micro-lens 131), a micro-lens 1311 (i.e., the micro-lens 131), and a micro-lens 1312 (i.e., the micro-lens 131) comprised by the lens layer 130; the object-space field of view of the micro-lens 1310, the object-space field of view of the micro-lens 1311, and the object-space field of view of the micro-lens 1312 are respectively the object-space field of view 320, the object-space field of view 321, and the object-space field of view 322, which are illustrated in FIG. 3F; the image-space field of view of the micro-lens 1310, the image-space field of view of the micro-lens 1311, and the image-space field of view of the micro-lens 1312 are respectively the image-space field of view 330, the image-space field of view 331, and the image-space field of view 332, which are illustrated in FIG. 3G. The object-space field of view has O point, O1 point, O2 point and B point. The image point of O point, the image point of O1 point, the image point of O2 point and the image point of B point are respectively O' point, O1' point, O2' point and B' point in the image-space field of view. The object-space field of view also has A point. Image points of A point are A' point and A2' point in the image-space field of view; in this case, the A' point is located at the edge of the image-space field of view of the micro-lens 1310, the B' point is located at the edge of the image-space field of view of the micro-lens 1312, the A2' point is a point in the image-space field of view of the micro-lens 1311, and the O' point, the O1' point, the O2' point are respectively the center of the image-space field of view of the micro-lens 1310, the center of the image-space field of view of the micro-lens 1311 and the center of the image-space field of view of the micro-lens 1312.

For example, the distance between the A' point and the O' point and the distance between the B' point and the O' point may be set according to the size of the object-space field of view and the magnification of the micro-lens; for example, in the case that the size of the object-space field of view and the magnification of the micro-lens respectively are respectively equal to 400 and 0.5, the distance between the A' point and the O' point and the distance between the B' point and the O' point may be set to be 100 and 182.8 micrometers.

For example, the optical aperture D1 of the micro-lens 131, the diameter D2 of the hole-like light-transmitting regions 151, the arch height h of the micro-lens 131, the radius R of the micro-lens 131, the focal length f' of the micro-lens 131, the thickness of the second substrate 162, the thickness of the intermediate dielectric layer 160 and the value of l' may be respectively set to be 160±5 micrometers, 60±10 micrometers, 34.5 micrometers, 110±5 micrometers, 339.2 micrometers, 165±5 micrometers, 260.5±5 micrometers and 460±10 micrometers; and in this case, the modulation transfer function MTF of the A' point, the relative illumination of the A' point (i.e., the relative illumination, of the A point located in the object-space field of view, at the A' point), the relative illumination of the B' point are respectively equal to 0.909, 0.521 and 0. For example, the modulation transfer function MTF of the A' point is equal to 0.909, and this indicates that the valley-ridge modulation degree of the fingerprint image obtained by the image array layer is good. For example, the relative illumination of the A' point is equal to 0.521, and this means that the relative illumination, of the A point located in the object-space field of view, at the A2' point is approximately equal to 0.521, and therefore, the relative illumination of the A point, which is located in the object-space field of view, is approximately equal to 0.521+0.521=1.042, and this indicates that the difference between brightness of adjacent valleys in the fingerprint image is relatively small. For example, the relative illumination of the B' point is equal to 0, and this means that the cross-talk of the fingerprint image is relatively small.

For another example, the optical aperture D1 of the micro-lens 131, the diameter D2 of the hole-like light-transmitting regions 151, the arch height h of the micro-lens 131, the radius R of the micro-lens 131, the focal length f' of the micro-lens 131, the thickness of the second substrate 162, the thickness of the intermediate dielectric layer 160 and the value of l' may be respectively set to be 172±5 micrometers, 60±10 micrometers, 41.4 micrometers, 110±5 micrometers, 339.2 micrometers, 160±5 micrometers, 258.6±5 micrometers and 460±10 micrometers, and in this case, the modulation transfer function MTF of the A' point, the relative illumination of the A' point (i.e., the relative illumination, of the A point located in the object-space field of view, at the A' point) and the relative illumination of the B' point are respectively equal to 0.909, 0.591 and 0. For example, the modulation transfer function MTF of the A' point is equal to 0.909, and this indicates that the valley-ridge modulation degree of the fingerprint image obtained by the image array layer is good; the relative illumination of the A' point (i.e., the relative illumination, of the A point located in the object-space field of view, at the A' point) is equal to 0.591, and this indicates that the relative illumination, of the A point located in the object-space field of view, at the A2' point is approximately equal to 0.591; therefore, the relative illumination of the A point, which is located in the object-space field of view is approximately equal to 0.591+0.591=1.182, and this indicates that the difference between brightness of adjacent valleys in the fingerprint image is relatively small; the relative illumination of the B' point is equal to 0, and this means that the cross-talk of the fingerprint image is relatively small.

It should be noted that, the modulation transfer function MTF is the ratio between the valley-ridge modulation degree of the fingerprint in the image space and the valley-ridge modulation degree of the fingerprint in the object space, and the fingerprint valley-ridge modulation degree $M=(Iv-Ip)/(Iv+Ip)$; in which Iv is light intensity of a region, corresponding to the fingerprint valley, of the imaging plane 142, and Ip is light intensity of a region, corresponding to the fingerprint ridge, of the imaging plane 142; the relative illumination indicates the brightness difference between adjacent fingerprint valleys in the fingerprint image, the greater the relative illumination, the smaller the brightness difference between adjacent fingerprint valleys.

It should be noted that, the above-mentioned structural parameters is designed in the case that the micro-lens 131 is the spherical lens, and the refractive index n1 of the micro-lens 131, the refractive index n2 of the medium around the micro-lens 131, and the refractive index n of the first substrate 161 and the second substrate 162 are respectively equal to 1.4918, 1 and 1.5164, but the embodiments of the present disclosure are not limited to this case. For example, in the case that the type of the micro-lens 131 is changed or/and at least one of the following values is changed: the value of the refractive index n1 of the micro-lens 131, the value of the refractive index n2 of the medium around the micro-lens 131, the value of the refractive n index of the first substrate 161 and the second substrate 162, other structural parameters of the display panel 100 may be changed accordingly, and no further descriptions will be given here.

For example, the display panel 100 provided by the embodiments of the present disclosure can achieve imaging function, so as to realize the fingerprint recognition function. Furthermore, in some embodiments, the contrast ratio (i.e., the valley-ridge modulation degree of the fingerprint image) of the fingerprint image obtained by the display panel 100 can be increased. Therefore, the display panel provided by the embodiments of the present disclosure may have under-screen fingerprint recognition capability, and thus design margin of an electronic device (for example, a mobile phone) including the display panel can be increased, compared with an electronic device adopting a separate imaging array or a separate fingerprint recognition module to realize the fingerprint recognition function. For example, the display panel 100 provided by the embodiments of the present disclosure is in favor of realizing a full screen mobile phone, enriching the appearance of mobile phones, improving the use experience and increasing market competitiveness.

Another embodiment of present disclosure provides a display panel 100. For example, FIG. 4A is cross-sectional view of the display panel 100 provided by another embodiment of present disclosure. The display panel 100 provided by the present embodiment is similar to the above-mentioned display panels 100, and therefore, the present embodiment will mainly describe the differences, and no further description will be given here for repeated content.

For example, as illustrated in FIG. 4A, the display panel 100 may further comprise a side light source 111, the side light source 111 may be provided on at least one side surface of the display-side substrate 110, and the light emitted by the side light source 111 may be incident onto the display-side substrate 110. For example, FIG. 4C is a plan view of the display panel 100, and the display panel 100 as illustrated in FIG. 4A may be taken along the DR1 direction of FIG. 4C. For example, the side light source is implemented as a stripe-shaped light source, and the reflective electrode or the reflective layer is able to allow at least part of light, which is emitted by the side light source and incident onto the reflective electrode or the reflective layer, to pass through the reflective electrode or the reflective layer. For example, as illustrated in FIG. 4C, the side light source 111 may be the stripe-shaped light source, and the size of the stripe-shaped light source in the DR2 direction, for example, may be equal to the size of the display-side substrate 110 in the DR2 direction, but the embodiments of the present disclosure are not limited to this case. For example, the side light source 111 may be in direct contact with at least one side surface of the display-side substrate 110; for another example, according to specific implementation demands, the side light source 111 may be separated from at least one side surface of the display-side substrate 110 with a predetermined distance being provided between the side light source 111 and at least one side surface of the display-side substrate 110.

For example, the side light source 111 and the display-side substrate 110 are configured to allow the light emitted by the side light source 111 to satisfy the total reflection condition of the first interface 112, and to allow at least part of the light emitted by the side light source 111 not to satisfy the total reflection condition of the second interface 113; the first interface 112 is an interface formed by the display-side substrate 110 and the air, and the second interface 113 is an interface formed by the display-side substrate 110 and the skin of the finger. For example, the prorogation path of the light emitted by the side light source 111 in the display-side substrate 110 is detailedly described in the following with reference to FIG. 4B and by taking the case that the refractive index n3 of the display-side substrate 110 is 1.5 as an example.

Figure 4B:
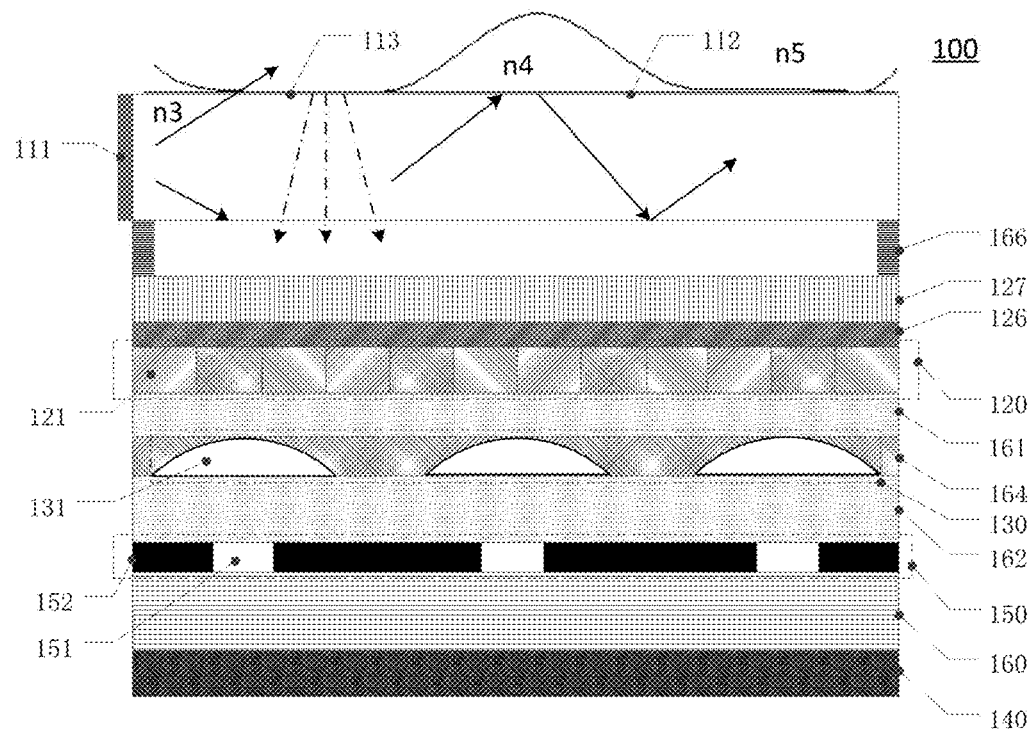
FIG. 4B is a diagram illustrating an exemplary working principle of a display panel provided by another embodiment of present disclosure illustratively.
Figure 4C:
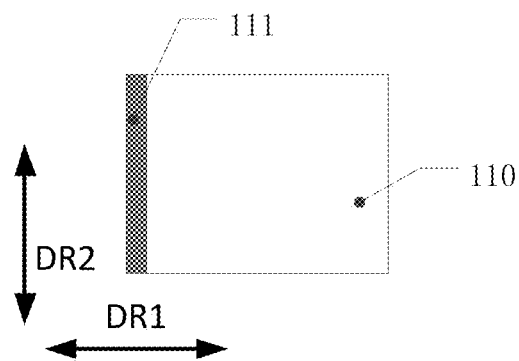
FIG. 4C is a schematic diagram of an exemplary arrangement of a side light source of a display panel provided by another embodiment of present disclosure.
Figure 4D:
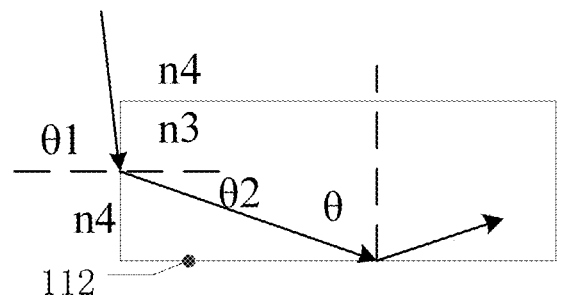
FIG. 4D is a schematic diagram illustrating a propagation path of light emitted by a side light source provided by another embodiment of present disclosure.

For example, as illustrated in FIG. 4B and FIG. 4D, in the case that the prorogation angle θ (i.e., the angle between the light and the normal direction of the surface of the display-side substrate 110) of light prorogated in the display-side substrate 110 is larger than arcsin(n4/n3)=arcsin(1/1.5)×180/π=41.8 degrees, the total reflection condition of the first interface 112 can be satisfied. For example, in the case that the incidence angle of the light emitted by the side light source 111 is θ1, the prorogation angle θ of the light emitted by the side light source 111 prorogated in the display-side substrate 110 satisfies the following equation:

$$\theta=90-\theta2=90-\arcsin(\sin(\theta1)/1.5)\times180/\pi$$

Therefore, in the case that the incidence angle θ1 of the light emitted by the side light source 111 is 90 degrees, the prorogation angle θ of the light, which is emitted by the side light source 111 and prorogated in the display-side substrate 110, is 48.2 degrees. Furthermore, in the case that the incidence angle θ1 of the light emitted by the side light source 111 is smaller than 90 degrees, the prorogation angle θ of the light, which is emitted by the side light source 111 and prorogated in the display-side substrate 110, is larger than 48.2 degrees. Therefore, in the case that the refractive index n3 of the display-side substrate 110 is 1.5, all the light emitted by the side light source 111 satisfies the total reflection condition of the first interface 112, that is, in the case that the light emitted by the side light source 111 is incident onto the first interface 112, all of the light emitted by the side light source 111 enters into and propagates in the display-side substrate 110.

For example, as illustrated in FIG. 4B, because the refractive index n5 of the skin of the finger is approximately equal to 1.55 and the refractive index n3 of the display-side substrate 110 is 1.5, the light emitted by the side light source 111 do not satisfy the total reflection condition of the second interface 113. For example, in the case that the light emitted by the side light source 111 is incident onto the second interface 113, the light emitted by the side light source 111 leaves the display-side substrate 110 via the second interface 113 (for example, the interface formed by the fingerprint ridge and the display-side substrate 110), and then diffusedly reflected by the skin of the finger to form diffusion light; part of the diffuse light is back into the display-side substrate 110 and incident onto the image array layer 140 at last.

For example, for the display panel 100 as illustrated in FIG. 4A and FIG. 4B, because the fingerprint ridge can allow the light emitted by the side light source 111 not to satisfy the total reflection condition of the first interface 112, as a result, the diffuse light incident onto the image array layer 140 can be formed. The fingerprint valley allow the light emitted by the side light source 111 to satisfy the total reflection condition of the first interface 112, and therefore, the diffuse light cannot be formed in a region corresponding to the fingerprint valley. Therefore, the image array layer 140 can receive light with brightness distribution corresponding to the fingerprint; in this case, light corresponding to the fingerprint ridge has relatively strong intensity, and light corresponding to the fingerprint valley has relatively weak intensity. Because the intensity of the light corresponding to the fingerprint valley can be very weak, the image array layer 140 can obtain fingerprint images with high contrast ratio (the modulation degree).

For example, the wavelength of the light emitted by the side light source 111 may be set according to specific implementation demands. For example, the wavelength of the light emitted by the side light source 111 may be located in the infrared wavelength range (for example, near-infrared wavelength range; for example 976 nm), and therefore, the interference to the images displayed by the display array layer 120 can be reduced, but the embodiments of the present disclosure are not limited to this case. For example, the display pixel 121 as illustrated in FIG. 4A may comprise the light-emitting diode 122 as illustrated in FIG. 2B, that is, both the cathode 125 and the anode 123 of the light-emitting diode 122 may be made from a transparent conductive material, and the light-emitting diode 122 comprises the reflective layer 128. The reflective layer 128 may reflect the light emitted by the light-emitting diode 122 (for example, at least part of the visible wavelength range), and may allow at least part of the light, which is emitted by the side light source 111 (for example, the infrared light) and incident onto the reflective layer 128, to pass through the reflective layer 128, and in this case, the image array layer 140 can form an image even in the case that no opening 129 is provided in the reflective layer 128. Furthermore, the intensity of the light incident onto the image array layer 140 can be increased by allowing at least part of the light, which is emitted by the side light source 111 and incident onto the reflective layer 128, to pass through the reflective layer 128, and therefore, the contrast ratio of the images obtained by the image array layer 140 can be increased accordingly.

It should be noted that, the refractive index n3 of the display-side substrate 110 provided by the present embodiment is not limited to be equal 1.5, the refractive index n3 of the display-side substrate 110 can adopt other values as long as the refractive index n3 of the display-side substrate 110 allows the light emitted by the side light source 111 to satisfy the total reflection condition of the first interface 112, and allows at least part of the light emitted by the side light source 111 not to satisfy the total reflection condition of the second interface 113.

It should be noted that, the wavelength of the light emitted by the side light source 111 is not limited to be in the infrared wavelength range, according to specific implementation demands, the wavelength of the light emitted by the side light source 111 (for example, the wavelength for imaging) may be in visible wavelength range, and in this case, the display pixel 121 emits no light at the wavelength for imaging.

For example, the display panel 100 provided by the present embodiment can achieve imaging function, so as to realize the fingerprint recognition function. Furthermore, in some embodiments, the contrast ratio of the fingerprint image obtained by the display panel 100 can be increased.

Figure 5A:
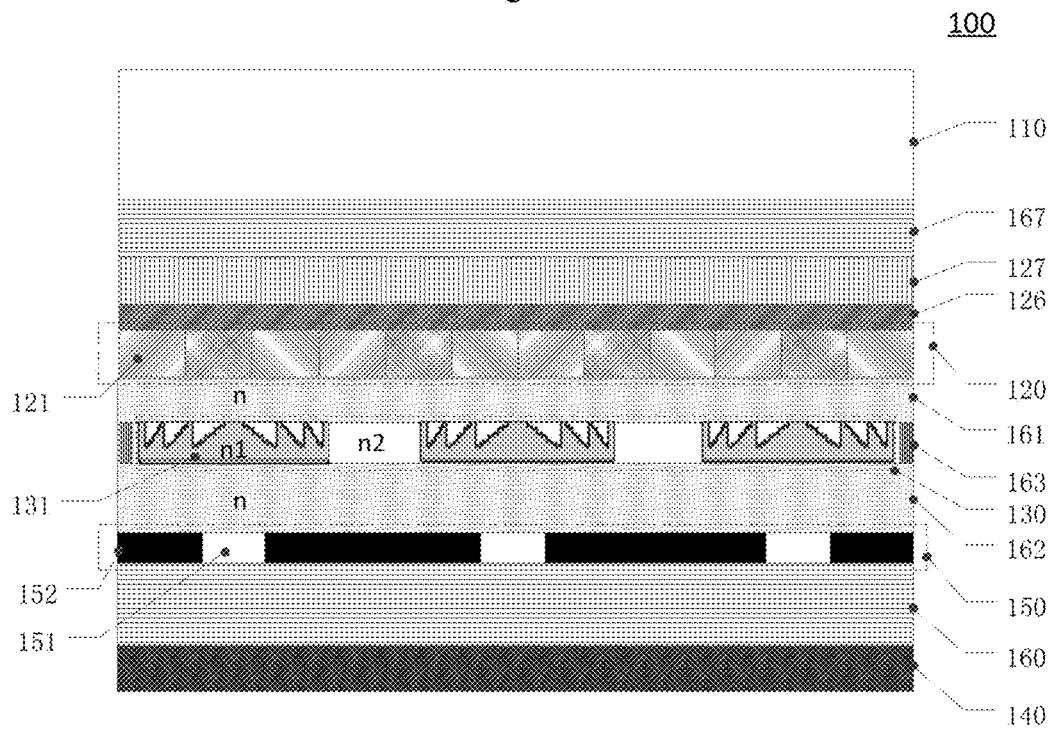
FIG. 5A is a cross-sectional view of a display panel provided by further another embodiment of present disclosure.

Further another embodiment of present disclosure provides a display panel 100. For example, FIG. 5A is a cross-sectional view of the display panel 100 provided by further another embodiment of present disclosure. The display panel 100 provided by further another embodiment of present disclosure is similar to the above-mentioned display panels 100, and therefore, the present embodiment will mainly describe the differences, and no further description will be given here for repeated content.

For example, compared with the display panel 100 as illustrated in FIG. 1A, the micro-lens 131 as illustrated in FIG. 5A and provided by the present embodiment may be implemented as a binary optical lens (for example, a Fresnel Lens). For example, the binary optical lens may be a diffractive lens (for example, a grating based diffractive lens), and in this case the thickness of the display panel 100 can be decreased. For example, the present embodiment is detailedly described by taking the case that the grating based diffractive lens is adopted to function as the binary optical lens as an example, but the micro-lens 131 provided by the present embodiment may adopt other suitable binary optical lens according to specific implementation demands.

For example, the grating based diffractive lens may be a diffractive lens of two phase levels (two steps), a diffractive lens of four phase levels (four steps), a diffractive lens of eight phase levels (eight steps), a diffractive lens of sixteen phase levels (sixteen steps) or other suitable diffractive lenses. For example, FIG. 5B illustrates a plan view of the diffractive lens of two phase levels, and FIG. 5C illustrates cross-sectional views of the diffractive lens of two phase levels, the diffractive lens of four phase levels and the diffractive lens of eight phase levels.

Figure 5B:
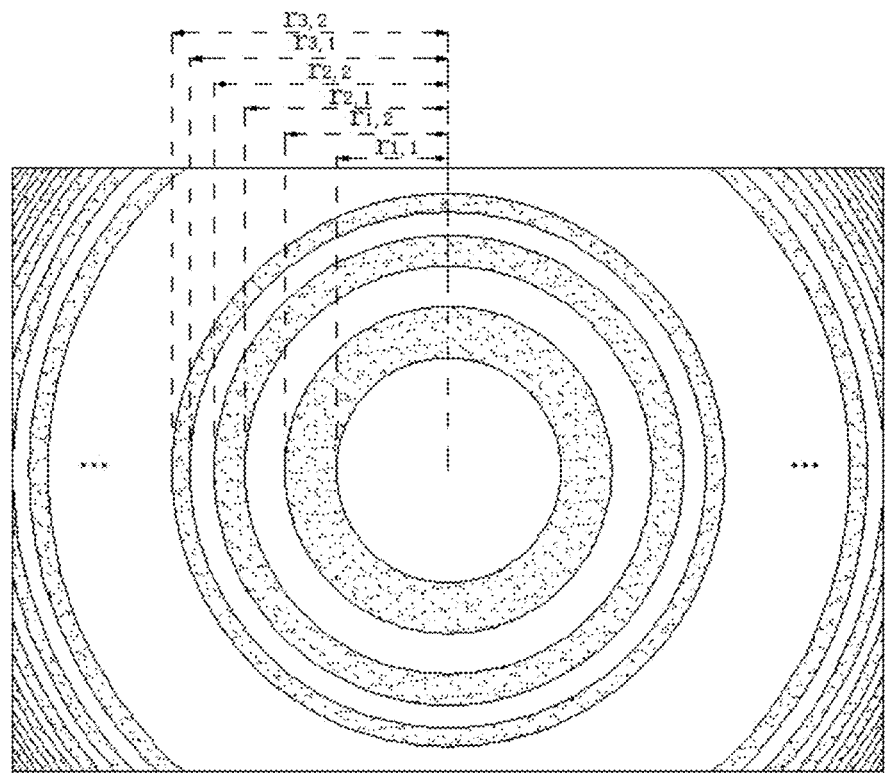
FIG. 5B is a plan view of a diffractive lens provided by further another embodiment of present disclosure.
Figure 5C:
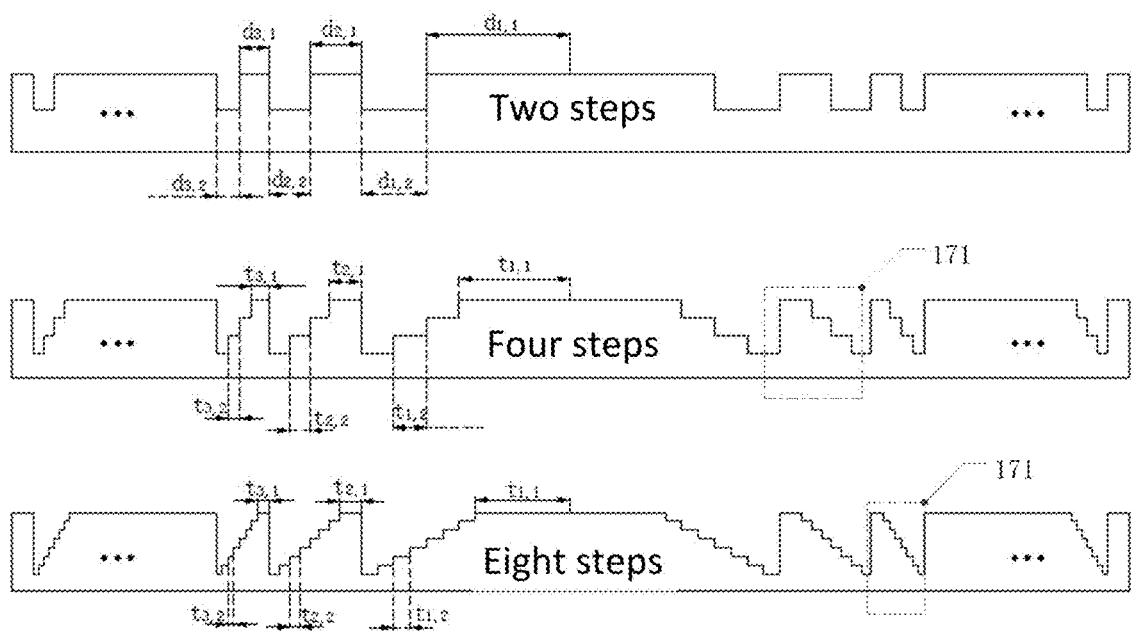
FIG. 5C illustrates cross-sectional views of diffractive lenses provided by further another embodiment of present disclosure.

For example, as illustrated in FIG. 5B and FIG. 5C, the diffractive lens may comprise M grating units 171 (for example, a phase grating unit), in which M is a positive integer; each of the grating units 171 may comprise N phase levels (N steps), in which $N=2^m$ (m=1, 2, 3 . . . ). For the diffractive lens of two phase levels, the diffractive lens of four phase levels and the diffractive lens of eight phase levels, the value of m are respectively equal to 1, 2 and 3. For example, the phase differences between adjacent steps may be $2\pi/N$, and the height of each step may be $h=\pi/(N\times(n1-n2))$; in this case, $\lambda$ is the wavelength of light incident onto the diffractive lens (in the case that the light incident onto the diffractive lens is white light, $\lambda$ may be set to be equal to 587 nm), n1 is the refractive index of the diffractive lens, n2 is the refractive index of the medium around the diffractive lens (n2 is equal to 1 in the case that the frame attaching method is adopted, n2 is equal to the refractive index of the filler 164 in the case that the surface attaching method is adopted). For example, in the case that the display panel 100 is provided with the first substrate 161 and the second substrate 162, and the first substrate 161 and the second substrate 162 are made of same one material, both the refractive index of the object-space medium of the diffractive lens and the refractive index of the image-space medium of the diffractive lens are both equal to n, but the embodiments of the present disclosure are not limited to this case.

For example, as illustrated in FIG. 5B, for a grating based diffractive lens with two phase levels, rj,1 (i.e., $r_{j,1}$) and rj,2 (i.e., $r_{j,2}$) are respectively inner radius and outer radius of the j th ring belt in the grating unit 171, in which j is a positive integer smaller than or equal to M. For example, rj,1 and rj,2, the focal length f', the refractive index n of the object-space medium and image-space medium, and the wavelength of the light incident onto the grating based diffractive lens satisfy the following equations:

$$r_{j,1} = \left[\left(f' + \frac{(2j-1)\lambda/2}{n}\right)^2 - f'^2\right]^{1/2} = \sqrt{\frac{(2j-1)f'\lambda}{n}}\left(1 - \frac{(2j-1)\lambda}{4nf'}\right)^{1/2}$$

$$r_{j,2} = \left[\left(f' + \frac{j\lambda}{n}\right)^2 - f'^2\right]^{1/2} = \sqrt{\frac{2jf'\lambda}{n}}\left(1 - \frac{j\lambda}{2nf'}\right)^{1/2}.$$

The step widths dj,1 (i.e., $d_{j,1}$) and dj,2 (i.e., $d_{j,2}$) of the diffractive lens of two phase levels are respectively satisfy the following equations:

$$d_{j,1} = r_{j,1} - r_{j-1,2}$$

$d_{j,2}=r_{j,2}-r_{j,1}$.

For example, as illustrated in FIG. 5C, for the grating based diffractive lens with N phase levels (steps), each of the grating unit 171 has N−1 steps with same one width, and the width of the remaining one step is different from the width of the above-mentioned N−1 steps; the width tj,2 (i.e., $t_{j,1}$) of the N−1 steps in j th grating unit 171 and the width tj,1 (i.e., $t_{j,2}$) of the remaining one step in the j th grating unit 171 are respectively satisfy the following equations:

$$t_{j,2} = \frac{d_{j,2}}{N/2}$$

$$t_{j,1} = d_{j,1} - \sum_{i=1}^{m-1} \frac{d_{j,2}}{2^i}.$$

For example, for the diffractive lens of eight phase levels, the width t1,2 of seven steps in a first grating unit 171, the width t1,1 of the remaining one step in the first grating unit 171, the width t2,2 of seven steps in a second grating unit 171, the width t2,1 of the remaining one step in the second grating unit 171, the width t3,2 of seven steps in a third grating unit 171, the width t3,1 of the remaining one step in the third grating unit 171 are respectively satisfy the following equations:

$$t_{1,2} = \frac{d_{1,2}}{4},$$

$$t_{1,1} = d_{1,1} - \frac{d_{1,2}}{2} - \frac{d_{1,2}}{4},$$

$$t_{2,2} = \frac{d_{2,2}}{4},$$

$$t_{2,1} = d_{2,1} - \frac{d_{2,2}}{2} - \frac{d_{2,2}}{4},$$

$$t_{3,2} = \frac{d_{3,2}}{4},$$

$$t_{3,1} = d_{3,1} - \frac{d_{3,2}}{2} - \frac{d_{3,2}}{4}.$$

For example, in the case that the focal length f′ of the diffractive lens is equal to 339.2 micrometers, the optical aperture D1 of the diffractive lens is equal to 172 micrometers, for the diffractive lens with eight phase levels, the diffractive lens with four phase levels and the diffractive lens with two phase levels, the heights of the steps are respectively 149.2 nm, 298.4 nm and 596.8 nm, and the diffraction efficiency are respectively 95%, 81% and 40.5%, that is, the diffraction efficiency of the diffractive lens is increased with an increase of the number of the steps; the widths of the steps of the diffractive lens with eight phase levels, four phase levels and two phase levels are respectively illustrated in table 1, table 2 and table 3.

It should be noted that, in the case that at least one of the focal length f′ and the optical aperture D1 is changed, the height and the width of the step-shaped diffractive lens may be changed accordingly. Furthermore, in the case that the micro-lens 131 provided by the present embodiment is implemented as other suitable binary optical lens, related parameters may be designed according to the focal length f′ and the optical aperture D1, and no further description will be given here.

Figure 5D:
FIG. 5D is a cross-sectional view of a lens layer provided by further another embodiment of present disclosure.

For example, as illustrated in FIG. 5D, a connection portion 132 may be provided between adjacent binary optical lenses, and the connection portion 132 may connects adjacent binary optical lenses (i.e., the micro-lens 131). For example, the thickness of the connection portion 132 in the direction perpendicular to the display-side substrate 110 may be equal to the maximum value of the thickness of the binary optical lens in the direction perpendicular to the display-side substrate 110 (for example, the distance between the first substrate 161 and the second substrate 162). For example, the binary optical lens and the connection portion 132 may be formed integrally.

For example, the display panel 100 provided by the present embodiment can achieve display functions. Furthermore, the thickness of the display panel 100 can be decreased by adopting the binary optical lens.

TABLE 1

| t1,1 | t1,2 | t2,1 | t2,2 | t3,1 | t3,2 | t4,1 | t4,2 | t5,1 | t5,2 |
|---|---|---|---|---|---|---|---|---|---|
| 7.898 | 1.187 | 1.339 | 0.768 | 0.872 | 0.613 | 0.680 | 0.525 | 0.572 | 0.467 |
| t6,1 | t6,2 | t7,1 | t7,2 | t8,1 | t8,2 | t9,1 | t9,2 | t10,1 | t10,2 |
| 0.503 | 0.425 | 0.453 | 0.392 | 0.415 | 0.366 | 0.386 | 0.345 | 0.361 | 0.327 |
| t11,1 | t11,2 | t12,1 | t12,2 | t13,1 | t13,2 | t14,1 | t14,2 | t15,1 | t15,2 |
| 0.341 | 0.312 | 0.324 | 0.298 | 0.309 | 0.287 | 0.297 | 0.276 | 0.285 | 0.267 |
| t16,1 | t16,2 | t17,1 | t17,2 | t18,1 | t18,2 | t19,1 | t19,2 | t20,1 | t20,2 |
| 0.275 | 0.259 | 0.265 | 0.251 | 0.258 | 0.244 | 0.250 | 0.238 | 0.243 | 0.232 |
| t21,1 | t21,2 | t22,1 | t22,2 | t23,1 | t23,2 | t24,1 | t24,2 | t25,1 | t25,2 |
| 0.237 | 0.226 | 0.231 | 0.221 | 0.226 | 0.216 | 0.221 | 0.212 | 0.216 | 0.207 |
| t26,1 | t26,2 | t27,1 | t27,2 | t28,1 | t28,2 | | | | |
| 0.211 | 0.203 | 0.208 | 0.200 | 0.204 | 0.197 | | | | |

TABLE 2

| t1,1 | t1,2 | t2,1 | t2,2 | t3,1 | t3,2 | t4,1 | t4,2 | t5,1 | t5,2 |
|---|---|---|---|---|---|---|---|---|---|
| 9.086 | 2.375 | 2.108 | 1.537 | 1.484 | 1.226 | 1.205 | 1.050 | 1.039 | 0.933 |
| t6,1 | t6,2 | t7,1 | t7,2 | t8,1 | t8,2 | t9,1 | t9,2 | t10,1 | t10,2 |
| 0.927 | 0.849 | 0.845 | 0.784 | 0.781 | 0.732 | 0.730 | 0.690 | 0.689 | 0.654 |
| t11,1 | t11,2 | t12,1 | t12,2 | t13,1 | t13,2 | t14,1 | t14,2 | t15,1 | t15,2 |
| 0.653 | 0.624 | 0.623 | 0.597 | 0.596 | 0.573 | 0.572 | 0.553 | 0.552 | 0.534 |
| t16,1 | t16,2 | t17,1 | t17,2 | t18,1 | t18,2 | t19,1 | t19,2 | t20,1 | t20,2 |
| 0.534 | 0.517 | 0.517 | 0.502 | 0.502 | 0.488 | 0.488 | 0.475 | 0.475 | 0.463 |
| t21,1 | t21,2 | t22,1 | t22,2 | t23,1 | t23,2 | t24,1 | t24,2 | t25,1 | t25,2 |
| 0.463 | 0.452 | 0.452 | 0.442 | 0.442 | 0.433 | 0.433 | 0.424 | 0.424 | 0.416 |
| t26,1 | t26,2 | t27,1 | t27,2 | t28,1 | t28,2 | | | | |
| 0.416 | 0.408 | 0.408 | 0.401 | 0.400 | 0.394 | | | | |

TABLE 3

| t1,1 | t1,2 | t2,1 | t2,2 | t3,1 | t3,2 | t4,1 | t4,2 | t5,1 | t5,2 |
|---|---|---|---|---|---|---|---|---|---|
| 11.460 | 4.749 | 3.646 | 3.075 | 2.711 | 2.451 | 2.255 | 2.100 | 1.973 | 1.867 |
| t6,1 | t6,2 | t7,1 | t7,2 | t8,1 | t8,2 | t9,1 | t9,2 | t10,1 | t10,2 |
| 1.777 | 1.698 | 1.630 | 1.568 | 1.514 | 1.465 | 1.421 | 1.380 | 1.343 | 1.308 |
| t11,1 | t11,2 | t12,1 | t12,2 | t13,1 | t13,2 | t14,1 | t14,2 | t15,1 | t15,2 |
| 1.277 | 1.247 | 1.220 | 1.194 | 1.170 | 1.147 | 1.126 | 1.105 | 1.086 | 1.068 |
| t16,1 | t16,2 | t17,1 | t17,2 | t18,1 | t18,2 | t19,1 | t19,2 | t20,1 | t20,2 |
| 1.051 | 1.035 | 1.019 | 1.004 | 0.990 | 0.976 | 0.963 | 0.951 | 0.939 | 0.927 |
| t21,1 | t21,2 | t22,1 | t22,2 | t23,1 | t23,2 | t24,1 | t24,2 | t25,1 | t25,2 |
| 0.916 | 0.905 | 0.895 | 0.885 | 0.875 | 0.866 | 0.857 | 0.848 | 0.840 | 0.832 |
| t26,1 | t26,2 | t27,1 | t27,2 | t28,1 | t28,2 | | | | |
| 0.823 | 0.816 | 0.808 | 0.801 | 0.794 | 0.787 | | | | |

Figure 6A:
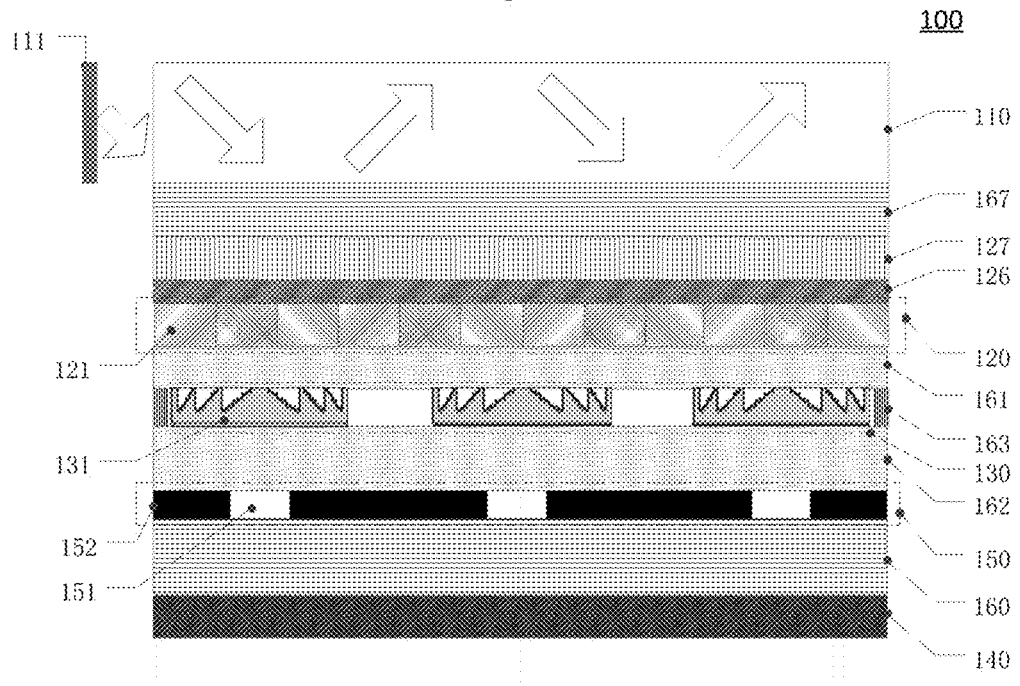
FIG. 6A is a cross-sectional view of a display panel provided by still another embodiment of present disclosure.

Still another embodiment of present disclosure provides a display panel 100. For example, FIG. 6A is a cross-sectional view of the display panel 100 provided by still another embodiment of present disclosure. The display panel 100 provided by still another embodiment of present disclosure is similar to the display panel 100 provided by further another embodiment of present disclosure, and therefore, the present embodiment will mainly describe the differences, and no further description will be given here for repeated content.

For example, compared with the display panel 100 as illustrated in FIG. 5A, the lens layer 130 of the display panel 100 as illustrated in FIG. 6A and provided by the present embodiment may comprise a side light source 111, and the side light source 111 may be provided on at least one side surface of the display-side substrate 110, and light emitted by the side light source 111 may be incident onto the display-side substrate 110.

For example, as illustrated in FIG. 6A, the display-side substrate 110 and the display array layer 120 are attached to each other through the surface attaching method, that is, a second intermediate dielectric layer 167 is adopted and provided between the display-side substrate 110 and the display array layer 120 (for example, the polarizing layer 127), and the second intermediate dielectric layer 167 is used to allow the display-side substrate 110 and the display array layer 120 to be adhered to each other. For example, in the case that the display-side substrate 110 and the display array layer 120 are attached to each other through the surface attaching method, the refractive index of the display-side substrate 110 may be approximately equal to 1.7-1.9 (for example, 1.8), and the refractive index of the second intermediate dielectric layer 167 may be approximately equal to 1.2-1.4 (for example, 1.3).

For example, refer to the afore-mentioned embodiment of present disclosure, all the light emitted by the side light source 111 satisfies the total reflection condition of the first interface 112, that is, the fingerprint valley allows the light emitted by the side light source 111 to satisfy the total reflection condition of the first interface 112, and therefore, no diffuse light is formed. Furthermore, part of the light emitted by the side light source 111 do not satisfy the total reflection condition of the second interface 113, that is, the fingerprint ridge allows part of the light emitted by the side light source 111 to satisfy the total reflection condition of the second interface 113, and therefore, the diffuse light incident onto the image array layer 140 can be formed. Therefore, the image array layer 140 can receive light with brightness distribution corresponding to the fingerprint; in this case, the light corresponding to the fingerprint ridge has relatively strong intensity, and the light corresponding to the fingerprint valley has relatively weak intensity. Because the intensity of the light corresponding to the fingerprint valley can be very weak, the image array layer 140 can obtain fingerprint images with high contrast ratio (the modulation degree).

Figure 6B:
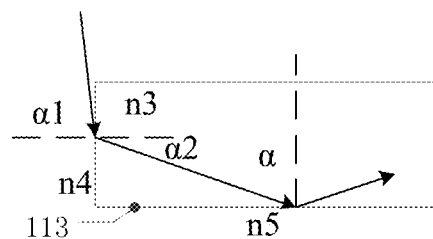
FIG. 6B is a schematic diagram illustrating a propagation path of light emitted by a side light source provided by still another embodiment of present disclosure.

For example, the reflection, of the light which is emitted by the side light source 111, by the second interface 113 is detailedly described in the following with reference to FIG. 6B. For example, as illustrated in FIG. 6B, in the case that the refractive index n3 of the display-side substrate 110, the refractive index n5 of the skin of the finger and the refractive index n4 of the air are respectively equal to 1.8, 1.55 and 1, and the propagation angle $\alpha$ of the light in the display-side substrate 110 is smaller than $\arcsin(n5/n3) \times 180/\pi$ (i.e., $\alpha 2$ is larger than $\alpha 0 = 90 - \arcsin(n5/n3) \times 180/\pi = 30.54$ degrees), the light propagated in the display-side substrate 110 do not satisfy the total reflection condition of the second interface 113, correspondingly, the incidence angle of the light emitted by the side light source 111 $\alpha 1$ is larger than $\arcsin(n3/n4 \times \sin(\alpha 0)) = 66$ degrees.

For example, in order to increase the proportion of light not satisfying the total reflection condition of the second interface 113 in all the light emitted by the side light source 111, and in turns increase the valley-ridge modulation degree (the contrast ratio) of the fingerprint image, as illustrated in FIG. 6A, the side light source 111 may be configured to emitted aligned light, and the aligned light emitted by the side light source 111 is incident onto at least one side surface of the display-side substrate 110 obliquely. For example, in the case that the refractive index n3 of the display-side substrate 110 is 1.8, the incline angle of the aligned light emitted by the side light source 111 may be 75 degrees, and in this case, all the light emitted by the side light source 111 do not satisfy the total reflection condition of the second interface 113, but the embodiments of the present disclosure are not limited to this case.

Figure 7:
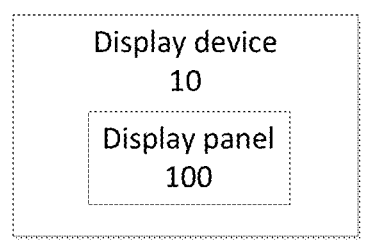
FIG. 7 is an exemplary block diagram of a display device provided by another embodiment of present disclosure.

Still another embodiment of present disclosure provides a display device. For example, as illustrated in FIG. 7, the display device 10 may comprise the display panel 100, the display panel 100 may be the display panel 100 provided by any one of the above-mentioned embodiments. It should be noted that those skilled in the art should understand that other indispensable components (such as a control device, an image data encoding/decoding device, a clock circuit or the like) may adopt conventional components/devices, no further descriptions will be given herein and it should not be taken as a limitation on the embodiments of the present disclosure.

For example, the display device 10 may be any products or device that has display function, such as a cell phone, a tablet computer, a television, a display screen, a laptop, a digital photo frame and a navigator. The display device has imaging capability.

The embodiments of the present disclosure provide a display panel and a display device, and the display panel and the display device have the imaging capability, such that the fingerprint identification function can be achieved.

It is apparent that the embodiments of the presented disclosure can be modified by those skilled in the art without departure from the spirit and scope of the disclosure, if the above modification of the presented disclosure belongs to the scope of the claims of the presented disclosure and its equivalent technologies, the presented disclosure is intended to comprise the above modifications.

What is described above is related to the illustrative embodiments of the disclosure only and not limitative to the scope of the disclosure; the scopes of the disclosure are defined by the accompanying claims.

What is claimed is:
1. A display panel, comprising:
   a display-side substrate;
   a display array layer, a lens layer and an image array layer, which are sequentially provided at a side of the display-side substrate;
   an aperture array layer, provided between the lens layer and the image array layer;
   wherein the display array layer comprises a plurality of display pixels arranged in an array,
   wherein the lens layer comprises a plurality of micro-lenses arranged in an array, and a surface, which is closer to the image array layer, of each of the plurality of the micro-lenses is a flat surface,
   wherein the image array layer comprises a plurality of image pixels arranged in an array, and is configured to form an image with light being reflected from a display side and passing through the lens layer,
   wherein the aperture array layer comprises hole-like light-transmitting regions arranged in an array and light-shielding regions configured for separating adjacent hole-like light-transmitting regions, the hole-like light-transmitting regions are in one-to-one correspondence with the plurality of the micro-lenses, and
   wherein a center of an orthographic projection of each of the plurality of the micro-lenses on the aperture array layer and a center of a corresponding hole-like light-transmitting region are overlapped with each other.

2. The display panel according to claim 1, wherein:
each of the plurality of the display pixels comprises a light-emitting diode and the light-emitting diode emits light toward the display side; and
the light-emitting diode comprises a reflective electrode or a reflective layer, so as to reflect the light emitted by the light-emitting diode toward the display side.

3. The display panel according to claim 2, wherein the reflective electrode or the reflective layer has an opening so as to allow the light reflected from the display side to pass through the reflective electrode or the reflective layer.

4. The display panel according to claim 1, wherein each of the plurality of the micro-lenses is a spherical lens, an aspheric lens or a binary optical lens.

5. The display panel according to claim 4, wherein:
a focal length of each of the plurality of the micro-lenses is in a range from 220 micrometers to 400 micrometers;
an optical aperture of each of the plurality of the micro-lenses is in a range from 100 micrometers to 220 micrometers; and
a spacing between adjacent micro-lenses is in a range from 250 micrometers to 300 micrometers.

6. The display panel according to claim 1, wherein a diameter of each of the hole-like light-transmitting regions is in a range from 40 micrometers to 80 micrometers.

7. The display panel according to claim 1, further comprising:
a first substrate, provided between the display array layer and the lens layer; and
a second substrate, provided between the aperture array layer and the lens layer.

8. The display panel according to claim 7, further comprising a first mold frame, wherein the first mold frame is provided between the first substrate and the second substrate and is opposite to a peripheral area of the display panel; and
refractive index of each of the plurality of the micro-lenses is in a range from 1.4 to 1.6.

9. The display panel according to claim 7, further comprising a filler, wherein:
the filler is provided between the first substrate and the second substrate and fills in a gap surrounding each of the plurality of the micro-lenses; and
refractive index of the lens layer is in a range from 1.7 to 1.9, and refractive index of the filler is in a range from 1.2 to 1.4.

10. The display panel according to claim 1, further comprising an intermediate dielectric layer; wherein:
the intermediate dielectric layer is provided between the image array layer and the aperture array layer;
the intermediate dielectric layer is configured to adhere the image array layer to the aperture array layer; and
the intermediate dielectric layer is further configured to adjust a distance, between the image array layer and the aperture array layer, in a direction perpendicular to the image array layer.

11. The display panel according to claim 2, further comprising a side light source, wherein:
the side light source is provided on at least one side of the display-side substrate, and light emitted by the side light source is incident onto the display-side substrate;
the side light source and the display-side substrate is configured to allow the light emitted by the side light source to satisfy total reflection condition of a first interface, and is further configured to allow at least part of the light emitted by the side light source not to satisfy total reflection condition of a second interface; and
the first interface is an interface formed by the display-side substrate and air, and the second interface is an interface formed by the display-side substrate and skin of a finger.

12. The display panel according to claim 1, further comprising a mold frame, wherein:
the mold frame is provided between the display-side substrate and the display array layer and is opposite to a peripheral area of the display panel; and
refractive index of the display-side substrate is in a range from 1.4 to 1.6.

13. A display device, comprising display panel, the display panel comprising:
a display-side substrate;
a display array layer, a lens layer and an image array layer, which are sequentially provided at a side of the display-side substrate;
an aperture array layer, provided between the lens layer and the image array layer;
wherein the display array layer comprises a plurality of display pixels arranged in an array,
wherein the lens layer comprises a plurality of micro-lenses arranged in an array, and a surface, which is closer to the image array layer, of each of the plurality of the micro-lenses is a flat surface,
wherein the image array layer comprises a plurality of image pixels arranged in an array, and is configured to form an image with light being reflected from a display side and passing through the lens layer,
wherein the aperture array layer comprises hole-like light-transmitting regions arranged in an array and light-shielding regions configured for separating adjacent hole-like light-transmitting regions, the hole-like light-transmitting regions are in one-to-one correspondence with the plurality of the micro-lenses, and
wherein a center of an orthographic projection of each of the plurality of the micro-lenses on the aperture array layer and a center of a corresponding hole-like light-transmitting region are overlapped with each other.

14. The display panel according to claim 3, further comprising a side light source, wherein:
the side light source is provided on at least one side of the display-side substrate, and light emitted by the side light source is incident onto the display-side substrate;
the side light source and the display-side substrate is configured to allow the light emitted by the side light source to satisfy total reflection condition of a first interface, and is further configured to allow at least part of the light emitted by the side light source not to satisfy total reflection condition of a second interface; and
the first interface is an interface formed by the display-side substrate and air, and the second interface is an interface formed by the display-side substrate and skin of a finger.

15. The display panel according to claim 1, further comprising a side light source, wherein:
the side light source is provided on at least one side of the display-side substrate, and light emitted by the side light source is incident onto the display-side substrate;
the side light source and the display-side substrate is configured to allow the light emitted by the side light source to satisfy total reflection condition of a first interface, and is further configured to allow at least part of the light emitted by the side light source not to satisfy total reflection condition of a second interface; and the first interface is an interface formed by the display-side substrate and air, and the second interface is an interface formed by the display-side substrate and skin of a finger.

16. The display panel according to claim 4, further comprising a side light source, wherein:

the side light source is provided on at least one side of the display-side substrate, and light emitted by the side light source is incident onto the display-side substrate;

the side light source and the display-side substrate is configured to allow the light emitted by the side light source to satisfy total reflection condition of a first interface, and is further configured to allow at least part of the light emitted by the side light source not to satisfy total reflection condition of a second interface; and the first interface is an interface formed by the display-side substrate and air, and the second interface is an interface formed by the display-side substrate and skin of a finger.

* * * * *